US006832121B1

(12) United States Patent
Albrecht et al.

(10) Patent No.: US 6,832,121 B1
(45) Date of Patent: Dec. 14, 2004

(54) DEVICE FOR MONITORING SAFETY-RELEVANT PROCESSES IN MACHINES

(75) Inventors: Kai Albrecht, Heidelberg (DE); Ulrich Grimm, Dielheim (DE); Reinhard Janzer, Bruchsal (DE); Michael Pritschow, Wiesloch (DE); Georg Rössler, Angelbachtal (DE); Andreas Wagner, Graben Neudorf (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/488,739

(22) Filed: Jan. 20, 2000

(30) Foreign Application Priority Data

Feb. 25, 1999 (DE) ........................................ 199 08 230

(51) Int. Cl.[7] ............................................ G05B 19/406
(52) U.S. Cl. ........................................................ 700/79
(58) Field of Search ........................................... 700/79

(56) References Cited

U.S. PATENT DOCUMENTS 5,086,401 A * 2/1992 Glassman et al. .......... 700/259
5,339,014 A * 8/1994 Nesper ....................... 318/563
5,880,954 A * 3/1999 Thomson et al. ............. 700/79
6,047,222 A * 4/2000 Burns et al. .................. 700/79
6,188,190 B1 * 2/2001 Arakawa .................... 318/560

FOREIGN PATENT DOCUMENTS

DE 4225834 A1 2/1994
DE 195 29 430 A1 1/1997

* cited by examiner

*Primary Examiner*—Emanuel Todd Voeltz
(74) *Attorney, Agent, or Firm*—Laurence A. Greenberg; Werner H. Stemer; Ralph E. Locher

(57) ABSTRACT

A device for monitoring safety-relevant processes in actuating/drive elements in machines having at least one operation control for safety-relevant and other than safety-relevant processes, at least one safety monitoring control, at least one safety input/output device and a redundantly constructed input/output system for safety-relevant processes, includes at least one field bus system connecting the operation control, the at least one safety input/output device and the at least one safety monitoring control to one another, at least one of the safety input/output device and the safety monitoring control being disposed in a distributed manner on an actuating/drive element for, respectively, initiating and performing a safety-relevant process; and a method of operating the device.

11 Claims, 3 Drawing Sheets

DEVICE FOR MONITORING SAFETY-RELEVANT PROCESSES IN MACHINES

BACKGROUND OF THE INVENTION

FIELD OF THE INVENTION

The invention relates to a device for monitoring safety-relevant processes in machines.

In the field of machine construction, in particular, printing machine construction, professional societies and trade associations require that safety-relevant processes in machines be performed in an intrinsically failsafe manner. In this regard, a control or part thereof is considered to be intrinsically failsafe if a single fault in the control does not lead to any danger. In circuitry technology, what is called for is that specific functions must be duplicated, i.e., they must be present in redundant form.

With regard to the control known as CP-Tronic from the firm Heidelberger Druckmaschinen AG of Heidelberg, Germany, this is accomplished by providing, in the control, a central safety module into which conditions of safety-relevant processes are read, in parallel, to the control modules. In this regard, to initiate a safety-relevant process, a switch having, respectively, a one break contact and a one make contact in two separate systems is read in and monitored, respectively. Accordingly, one cable leads to the control module, and a second redundant cable leads to a central safety module. The safety-relevant process is initiated only when simultaneous initiation of both contacts is identified both in the control module and in the safety module.

The main drive of the machine is likewise monitored by two systems of redundant construction and, if any safety-relevant conditions do not match, the drive is switched off. Redundant construction includes two computers, one of which is used to control the main drive, while the other is the actual machine control. If the actual main drive computer fails, the computer for machine control takes over the control function from the drive computer and shuts the main drive down in a controlled manner. In addition, various protective contacts, emergency-stop buttons, and so forth are read in via a safety module and are passed, on the one hand, via an input card indirectly to the drive computer and, in a redundant manner relative thereto, likewise to the drive computer, via direct pin inputs in the drive computer. Furthermore, the actual values of the main drive element are read in via two separate incremental transmitters, one of which is fitted directly to the motor and the other is fitted to a rotating part of the printing machine, for example to the plate cylinder. The signals from the first incremental transmitter in the motor are passed via separate signal cables to the drive computer, and the signals from the incremental transmitter on the plate cylinder are passed, likewise via separate signal cables, both to the drive computer and to the computer for machine control.

A disadvantageous feature of this technology is that a respective cable must be passed from each of the safety-relevant devices to the actual control modules, and an additional cable must be passed to the central safety module, in order to ensure that the condition is read in a redundant manner. This construction is, on the one hand, complex and expensive, and offers, on the other hand, only limited expansion options. The expansion options are likewise linked to high cable complexity, and expansion is possible only for as long as the central safety module has free inputs for reading in the safety-relevant condition.

Further known in the state of the prior art is the published German Patent Document DE 195 29 430 A1, which proposes so-called safety modules for monitoring electrical drive systems, particularly in printing machines having a plurality of drives. These safety modules are generally implemented as software and, overall, have three components. These three components are fault identification and diagnosis, decision making based upon the fault type and magnitude, and reaction or measure initiation. These safety modules have access to signals in the area of the functional parts, such as rotating cylinders in the printing machine, in the area of electric motors, electronics, the signal processing unit and the power supply units, and are constructed to compare or evaluate them for plausibility.

A disadvantageous feature of the prior art according to the aforementioned published German Patent Document DE 195 29 430 A1 is that, apart from monitoring the drives, no other monitoring functions are taken into account for other safety-relevant processes. Thus, no safety-relevant inputs can be read in, and no redundant safety outputs can be set.

SUMMARY OF THE INVENTION

Based upon the foregoing state of the prior art, it is accordingly an object of the invention to provide a device for monitoring safety-relevant processes in machines that offers a more cost-effective solution, by which expansion of safety-relevant functions is possible without additional cable complexity. Furthermore, it is an object of the invention to comply with the conditions specified by the professional societies and trade associations while at the same time providing simplification.

With the foregoing and other objects in view, there is provided, in accordance with a first aspect of the invention, a device for monitoring safety-relevant processes in actuating/drive elements in machines having at least one operation control for safety-relevant and other than safety-relevant processes, at least one safety monitoring control, at least one safety input/output device and a redundantly constructed input/output system for safety-relevant processes, comprising at least one field bus system connecting the operation control, the at least one safety input/output device and the at least one safety monitoring control to one another, at least one of the safety input/output device and the safety monitoring control being disposed in a distributed manner on an actuating/drive element for, respectively, initiating and performing a safety-relevant process.

In accordance with another feature of the invention, the at least one safety input/output device is arranged in a decentralized manner close to the respective actuating/drive element, and the at least one safety input/output device is connected by the field bus system to at least one safety monitoring control.

In accordance with a further feature of the invention, the safety input/output device is serviceable as an input/output device for other than safety-relevant processes.

In accordance with an added feature of the invention, the safety input/output device and the input/output device for other than safety-relevant processes are mutually interchangeable.

In accordance with an additional feature of the invention, at least one of the safety monitoring control and the safety input/output device is configurable in accordance with the application thereof.

In accordance with yet another feature of the invention, the monitoring device includes a bus coupler for coupling the one field bus system and at least another field bus system of different machine components to one another for safety purposes.

In accordance with yet a further feature of the invention, the field bus system is a CAN-bus.

In accordance with a second aspect of the invention, there is provided a method for monitoring safety-relevant processes in actuating/drive elements of machines having at least one operational computer, at least one control for safety-relevant processes, at least one safety monitoring control, at least one safety input/output device and a redundantly constructed input/output system for safety-relevant processes, which comprises applying to the bus system information read in by the at least one safety input/output device, and accepting, by the at least one safety monitoring control, the information applied to the bus system, only if this information is relevant for the safety monitoring control.

In accordance with another mode, the method of the invention includes performing a consistency check in one of the operation control, the safety monitoring control and a bus coupler.

In accordance with a further mode, the method of the invention includes defining different monitoring criteria based upon the information read in by the at least one safety input/output device.

In accordance with a concomitant mode, the method of the invention includes defining different monitoring criteria which are governed by different operating modes of the machine.

An advantage of the invention is that the states which are relevant for safety are not read in centrally at a point which can be accessed by cable, but in a decentralized manner, directly at the point at which the state is produced and changed, respectively. Thus, a bus system that is installed for transmitting these state signals is routed along the printing machine and connects a plurality of locally installed safety input/output devices to one or more safety monitoring controls which are responsible for a safety-critical area. The connection to form the bus system takes place over the shortest distance from the point at which the safety-relevant state is read in. Simple expansion to add additional monitoring of the other safety-relevant states is possible due to the fact that safety monitoring controls and a safety reading device, which are of modular construction, can be connected over all to the bus system.

The safety input/output devices are installed locally, whereat emergency-stop buttons or so-called limit switches for a protective device are located. Furthermore, the safety reading device also checks analog signals, such as the temperature of a drier, which can result in a switch-off if a maximum value is exceeded. The safety input/output device reads in the state changes of the emergency-stop buttons, limit switches or temperature sensors, and transmits them by a bus system to a safety monitoring control. The safety monitoring control is, for example, applied locally to a drive element which carries out a continuous or non-continuous, safety-critical movement. The movement is safety-critical due to the fact that an operator can enter the danger area thereof. A safety input/output device is likewise connected between the drive element and the safety monitoring control, reads in the safety-relevant signals from the drive element, and reports them to the safety monitoring control. The safety input/output device and the safety monitoring control can in this case be integrated into one unit.

The safety input/output device applies the read-in state thereof to the bus system, as a result of which all the safety monitoring controls connected to the bus system have access to the reported information. This process is referred to as broadcasting. A safety monitoring control decides for itself whether it has any interest in the reported information. Consequently, the information is ignored if the reported safety-critical state is not relevant for the drive that is monitored by that safety monitoring control. However, appropriate measures are carried out if the reported safety-critical state is relevant to the drive that is monitored by that safety monitoring control. Each safety monitoring control thus adopts only that which is significant thereto, depending upon the responsibility thereof. Specific evaluation and assessment, respectively, of only important information relieves the safety system of ballast, because only necessary information is processed.

Due to the redundancy, the aforementioned emergency-stop buttons and limit switches are equipped with duplicated contacts, one of which is read by the safety input/output device, and the other is read via a separate operating input/output device. Alternatively, it is possible to use the same safety input/output device to read both contacts, but via separate inputs. The input/output device provided for operation reports the information thereof to the actual operation control that is performing the corresponding functions. Where the safety input/output device reads both contacts, the process provided for operation is also performed by the operation control. There is no abandonment thereby of the safety concept, but only, the reading-in process is carried out by the same hardware facilities. The safety monitoring control that has access to the information from the safety input/output device uses this information to determine the permissible operating modes and does not become active until a fault or error state is present. A fault or error state is present, for example, when a drive is outside the predefined control range of the operation control. Redundancy is achieved by the duplicated configuration of the contacts of the respective switches and push buttons, and the duplicated configuration of the input/output devices ("normal" input/output device and safety input/output device). In addition to the encoder on the motor, either an additional encoder is installed in the drive itself, or the transmitter on the motor is used as such, and is then provided with redundant evaluation. The signals, which are always duplicated, are supplied to the drive control and to the safety monitoring control.

In addition to the so-called hardware redundancy mentioned hereinabove, redundancy also exists in the monitoring of the function. Thus, the safety monitoring control is assigned as a monitoring device to the operation control. If the operation control fails or a malfunction occurs, all the safety-relevant functions are brought to a safe state by the safety monitoring control. This is possible, because both the operation control and the safety monitoring control have the same information about the safety-relevant operating states. The term "the same information" is true as long as the redundant monitoring of the safety-relevant operating states provides identical results. If this is not the case, the safety monitoring control comes into play. A consistency check is carried out to check whether the information in the operation control and in the safety monitoring control matches. This check may be carried out in the operation control or in the safety monitoring control. If the various controls are attached to separate bus systems, which are connected by bus couplers, the consistency check can also be carried out in the bus coupler. The consistency check provides the advantage that the machine cannot be started again after a fault or error state, until the fault or error has been rectified.

In the end, the control (the actual operation control or the redundant safety monitoring control) which determines the measure is defined as follows: Normal operation is always performed by the actual operation control. Operation is normal provided the safety monitoring control does not detect a fault or error state in the operation control. If a fault or error state is present, the safety monitoring control comes into action and brings the actuating/drive element to the safe state in accordance with the predefined requirements.

The bus system need not be of redundant construction; the requirement, in fact, is only that a failure of the bus system be reliably identified. This is because the safety monitoring control is assigned directly to the drive, and if the bus system fails, a routine which is stored in the safety monitoring control brings the drive to the safe state.

The same is true for the safety input/output device. If it identifies a failure in the bus system, measures are likewise initiated to ensure that the actuating elements to be driven are brought to a safe state. These measures are likewise stored in the safety input/output device.

However, because the transmission speed of a bus system is adversely affected if a large number of subscribers are connected thereto or if the distance covered by a bus system is very long, it is feasible to provide separate bus systems for the safety route and for the operation route. In this case, one bus system is coupled to the other by a bus coupling. It is also feasible for a plurality of bus systems to be connected by such a bus coupling. The construction ensures that the transmission speed of a bus system is not adversely affected. Alternatively, any adverse effect upon the transmission speed of the bus system is identified, and the machine is brought to the safe state.

In order to recognize whether a bus system has failed, it is possible to send information to the various subscribers using a defined clock cycle. If no information is received, this is assessed as a failure of the bus system, and the safety monitoring controls for which the failure of the bus system is relevant activate the routines which lead to the safe state. This monitoring process is known as a "Watch Dog". If information is transmitted and received cyclically, it is possible, if a local bus system fails, to identify which of the local bus systems is defective. It is then also feasible for the bus coupling to pass information to those bus systems which remain intact, due to which the defect in the defective bus system is reported. The safety monitoring device itself now decides whether or not to react to this message on a bus system that is still intact because it recognizes from the situation whether a safety-critical state does or does not exist.

A further modified embodiment of the invention provides for different monitoring criteria to be defined for different operating states of the machine. If a machine is operated with a protective guard open in a slow-motion movement that differs from the actual operational situation, this process is subject to different safety requirements, which are defined by appropriate inputs by the operator. For example, this slow-motion movement can be initiated by pressing a separate switch or push button. Because this slow-motion movement is safety-relevant and the open protective guard is identified by the safety input/output device, appropriate information is available to the safety monitoring control. In contrast with the normal operational situation, wherein an open protective guard would result in the machine being stopped, the safety monitoring control can then allow the maximum drive element speed, even with the protective guard open. This calls for a granting of clearance to operate the drive. Different monitoring criteria can, furthermore, relate to the monitoring of the angle position, the acceleration, the torque or other parameters. Different safety requirements can thus be assigned to the various operating modes.

With regard to the physical arrangement of the safety monitoring control, the following version is possible: The actuating/drive element has a regulator, a converter and a power section directly assigned thereto. This regulator receives instructions from the operation control, for example, as follows: drive at a constant rotation speed of 3,000 copies/h, stop the drive element at an angular position of 270 degrees, and so forth.

Thus, the operation control has the task of controlling and outputting instructions. The safety monitoring control which now monitors the operation control and the drives is therefore also assigned to the actuating/drive element because, in the event of a fault or error, reversion to the safe state can be performed directly on the actuating/drive element, even without any requirement for instructions to be sent via the bus system. In this case, the safety monitoring control uses redundant signals to bring the actuating/drive element to the safe state. The safety input/output device is spatially or physically disposed in a similar manner, and is also installed directly at the location where reading-in and outputting, respectively, take place.

Because this safety input/output device has a universal construction with a plurality of inputs/outputs, which may possibly be freely definable, this device can also be used to control non-safety-relevant inputs or outputs. The safety input/output device thus has two functions. The system may be said to have cost-saving redundancy, not the least due to the aforementioned double function.

The freely configurable inputs/outputs of the safety input/output device offer the advantage that they can be manufactured in large quantities as modules, and are therefore cost-effective.

An additional advantage of standardization is that the servicing technician has to be concerned only about a small number of versions on site so that, consequently, replacement can be performed quickly, and the machine availability can be restored quickly as well. It is also possible to remove a safety input/output device from a component that is not used much or is not used in various operating modes, and to use it to replace one that is defective. The module could be configured by software programming performed by the machine operation computer. In order to comply with the regulations of professional institutions, final safety acceptance will be required if this were done with the object, for example, of preventing the machine from being started if the configuration of the safety input/output devices is incorrect.

A further version provides for the situation wherein a machine is not formed only of one component but, as is normal in the printing industry, is composed of a printing machine which prints images on paper, with this machine being followed by a further-processing machine, for example, a folder. Intrinsically, for control purposes, the two components may form separate units, although they may be regarded as one unit in the safety concept. For this situation, the invention provides for the respective separate bus systems to be connected to one another by a bus coupler, so that the safety-relevant information from the safety input/output devices is accessible to all the safety monitoring controls coupled to the two bus systems. The procedure for handling information is identical to that described initially. It is, of course, also feasible to couple a plurality of bus systems.

Other features which are considered as characteristic for the invention are set forth in the appended claims.

Although the invention is illustrated and described herein as embodied in a device for monitoring safety-relevant processes in machines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, wherein:

DESCRIPTION OF THE PREFERRED EMBODIMENTS

Figure 1:
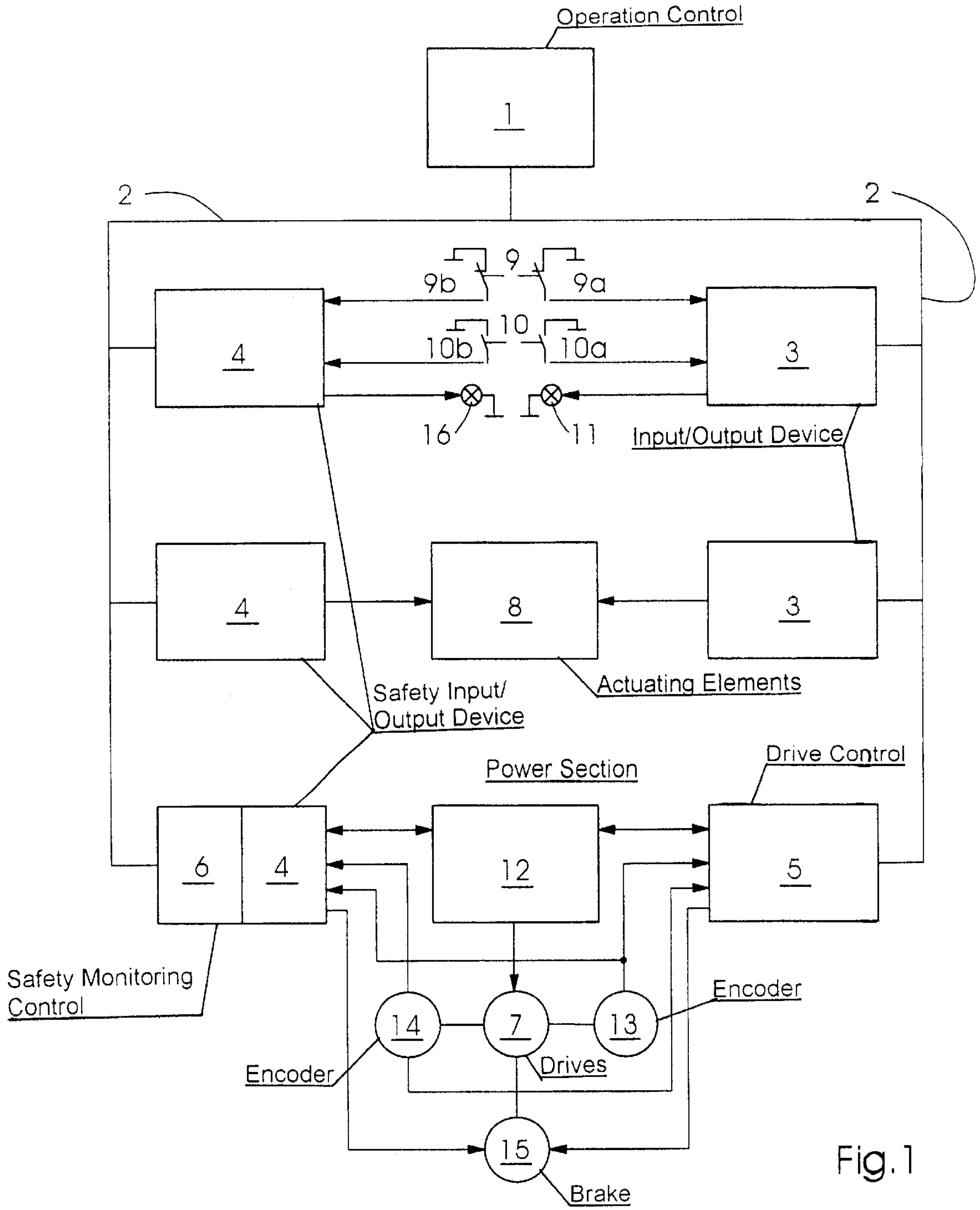
FIG. 1 is a block diagram of the device for monitoring safety-relevant processes in machines, that illustrates the safety concept.

Referring now to the drawings and, first, particularly to FIG. 1 thereof, there is shown therein an operation control 1 for a number of drive and actuating processes in an otherwise non-illustrated machine, preferably a printing machine. This operation control 1 is connected by a bus system 2 to a number of input/output devices 3, to safety input/output devices 4, to a drive control 5 and to a safety monitoring control 6. The operation control 1 has the task of coordinating various drives 7, which relate to the main drive for the machine, auxiliary drives for various tasks such as raising and lowering the paper stack or sheet pile, driving an ink fountain roller or the like, as well as to actuating drives, for example, for moving registers. In addition, the operation control 1 also coordinates the cooperation of actuating elements 8, and the reading of a switch 9 having switch contacts 9*a* and 9*b*, and a switch 10 having switch contacts 10*a* and 10*b* or displays or indications 11. The input/output devices 3 and the drive control 5 serve as input/output elements. The safety-relevant movement or adjustment processes have a safety input/output device 4 assigned thereto, which controls and/or reads these processes in a redundant manner.

The drive 7 which, as already mentioned hereinbefore, may be a main drive, an auxiliary drive or an actuating drive that, in turn, may be constructed with motors based upon widely differing technologies, such as DC motors, three-phase motors, brushless motors, and so forth, is set in operation by the drive control 5, via a power section 12. The link between the drive control 5 and the power section 12 is bi-directional. The safety input/output device 4 also has bi-directional access to the power section 12. Respective encoders 13 and 14 are located on the drive 7 and are each formed of a transmitter and an evaluation circuit, by which the position and possibly, as well, the rotational speed of the drive 7, is detected. This information is passed from the two encoders 13 and 14 to the drive control 5, on the one hand, and to the safety input/output device 4, on the other hand. Furthermore, both the drive control 5 and the safety input/output device 4 have the capability of driving a brake 15, that is operatively connected mechanically to the drive 7, and can stop the latter in an emergency. If a malfunction should occur in the drive control 5, due to which the drive 7 is operated beyond the specified rotational speed, the safety monitoring device 6 acts directly upon the power section 12, interrupts the electrical power supply to the drive 7, and causes the brake 15 to be applied. The drive 7 is thus brought to a safe state.

The actuating element 8 that may be, for example, a pneumatic cylinder for throwing on and throwing of f ink rollers, is activated by an input/output control 3. Redundant thereto, access is also provided via a safety input/output device 4. If a malfunction should occur here, the safety input/output device 4 would bring the actuating element 8 to the safe state.

The switches 9 and 10 are safety-relevant because, for example, they initiate an emergency stop or represent the open state of a protective guard. Both state or condition checks are regarded as being safety-relevant inputs, for which reason redundant switch contacts 9*a* and 9*b*, and 10*a* and 10*b* are required. These are read in on separate routes through the input/output device 3 and the safety input/output device 4. The safety input/output device 4 may be the same device for all applications, or may be separate for each application. This depends upon the number of inputs/outputs available and upon the physical arrangement. When the switches 9 and 10 are operating correctly, the switch contacts 9*a* and 9*b*, and 10*a* and 10*b* are always in the same states. If a switch contact 9*a*, 9*b* or 10*a*, 10*b* is faulty or if the cable link between the switch contact 9*a*, 9*b* or 10*a*, 10*b* is faulty, different states are identified in the input/output device 3 and in the safety input/output device 4. The safety monitoring device 6 then brings the drive 7 and the actuating element 8 to the safe state.

The operation control 1 can also serve to provide access to inputs or outputs which are operated by the safety input/output device 4. These inputs or outputs are then defined as normal inputs or outputs, i.e., they are not regarded as being safety-relevant. An advantage thereof is that free, unused inputs or outputs on the safety input/output device can be used. These inputs and outputs serve, for example, for providing the indication or display 16 or similar functions.

Figure 2:
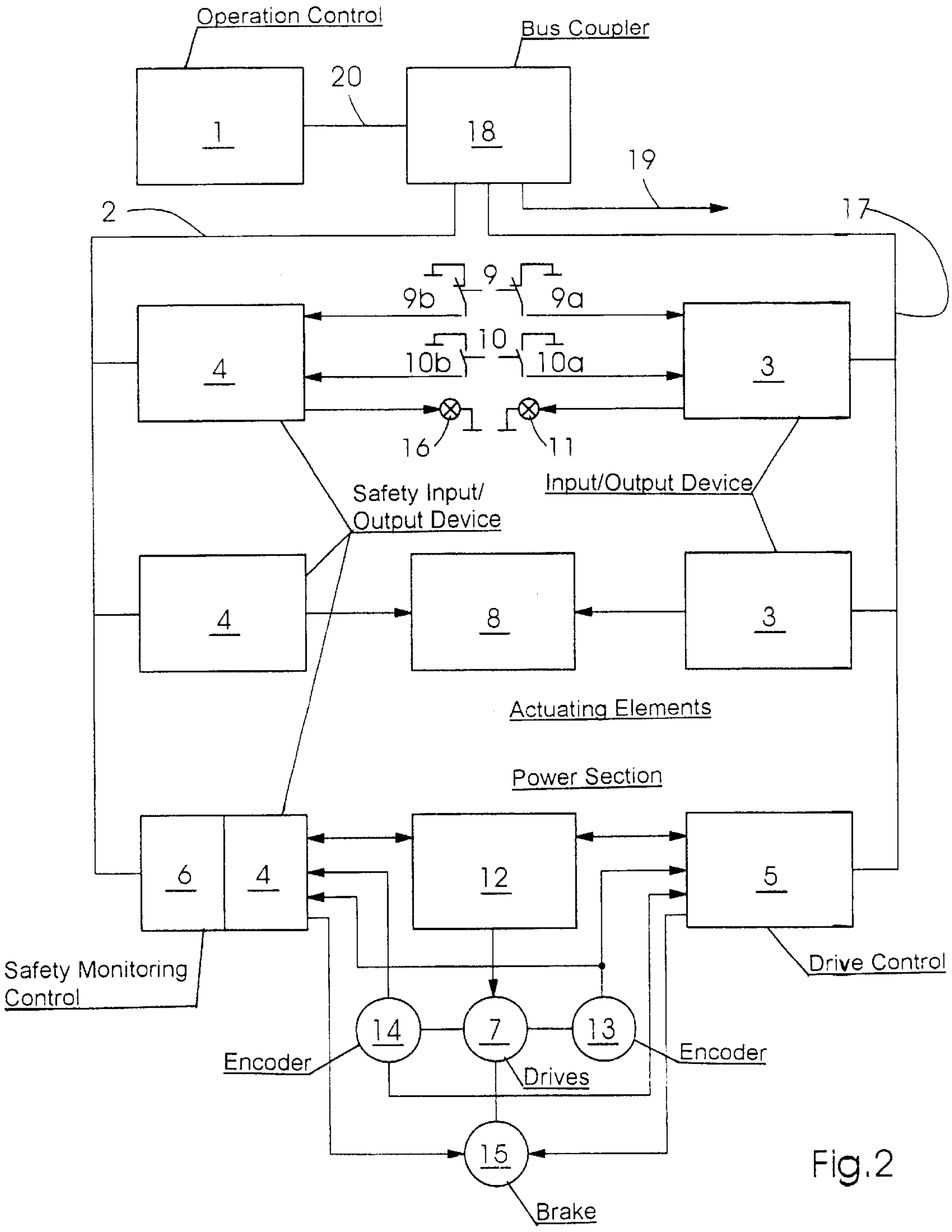
FIG. 2 is a block diagram like that of FIG. 1 of another embodiment of the monitoring device having separate bus systems.

FIG. 2 shows virtually the same arrangement of the safety devices as is shown in FIG. 1, but with separately formed bus systems. In this regard, the bus system 2 serves as the link between the safety input/output device 4 and the safety monitoring device 6, while an additional bus system 17 provides the link between the input/output device 3 and the drive control 5 of the actual operation devices. This constellation is advantageous when there are a large number of bus subscribers 3, 4, 5 and 6 attached to the bus system or when the cable length of the bus system exceeds a given length. In FIG. 2, the bus systems 2 and 17 are coupled by a bus coupler 18. As is apparent, further bus systems 19 can also be linked through the bus coupler 18. The operation control 1 is connected to the bus coupler 18 through a further bus system 20 which may be, for example, a VME bus system.

Figure 3:
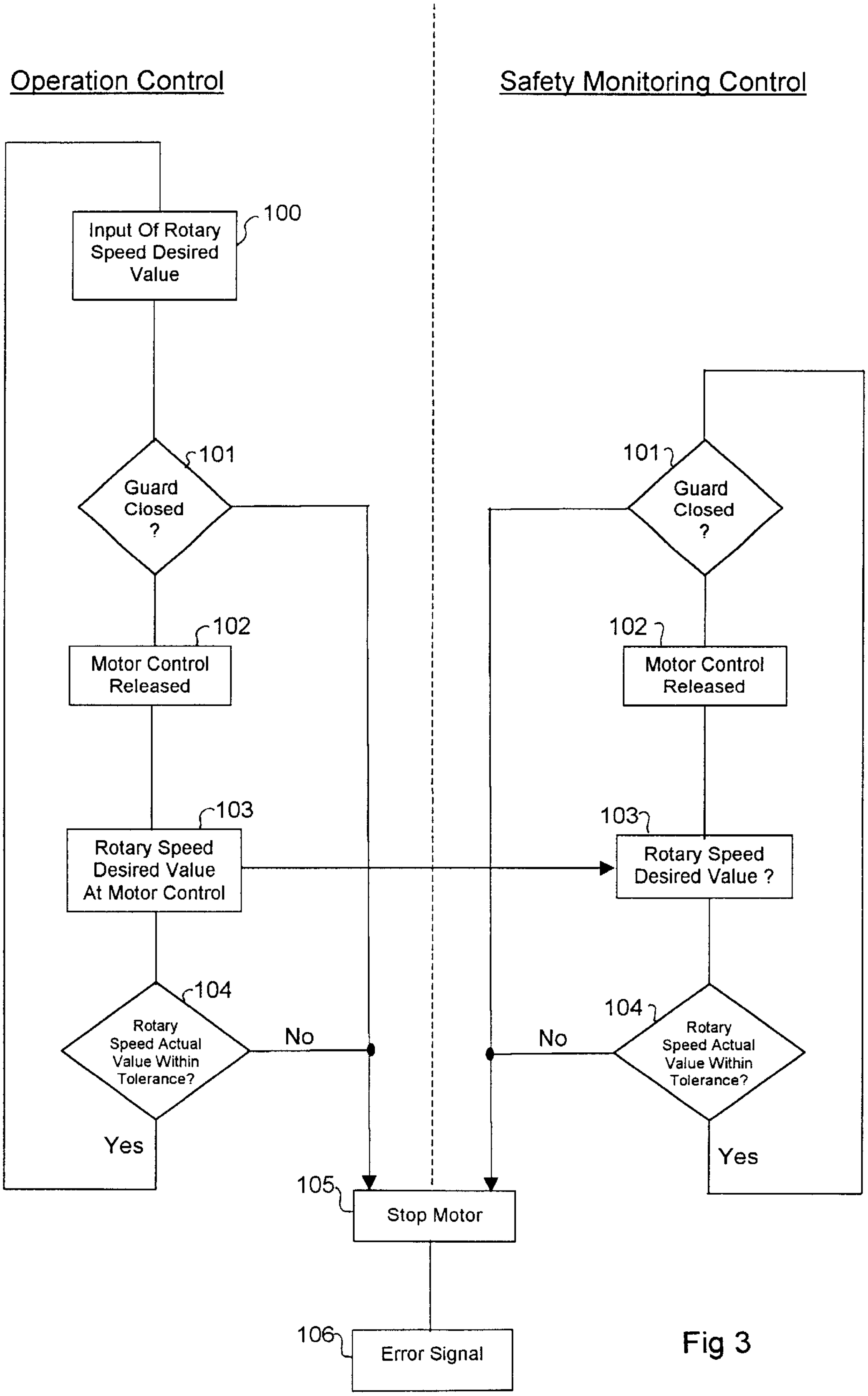
FIG. 3 is a flow chart depicting the operation of the monitoring device for a machine.

A flow chart is presented in FIG. 3 for better explaining the invention of the instant application as well as the state of the art as exemplified by the published non-prosecuted German Patent Application DE 42 25 834 A1. The invention represents an operation control and a safety monitoring control, respectively, for an electric motor. As is believed to be readily apparent, the vertical broken line separates two independently operating circuits, respectively, concerned with the operation control on the lefthand side of the figure, and with the monitoring control on the righthand side of the figure.

The actual operation control receives at 100 an input of the rotary speed at a desired value. Tests are then made at 101 whether all of the safety devices, which are supposed to prevent an accident, are closed. A guard is referred to, by way of example, in the flow chart, however, many other different protective devices may be used. Because these guards have redundant interrogation devices, they are redundantly monitored by the safety monitoring control. The motor control is released at 102 in accordance with the conditions of the guards.

Monitoring of the rotary speed then follows by comparing the foregoing input of the desired or nominal rotary speed input at 103 with the actual rotary speed input at 104. The actual rotary speed is determined by two separate encoders 13 and 14 and is thus fed to both the operation control and the safety monitoring control. Both systems then execute a control at 104 as to whether the actual rotary speed with respect to the desired or nominal rotary speed lies within a given tolerance. If it does lie within the tolerance, an ordinary operation of the motor is assured. If the tolerance is exceeded, the motor is stopped at 105 and an error is signalled at 106.

We claim:

1. A device for monitoring safety-relevant processes in actuating/drive elements in machines, the device comprising:

at least one operation control for safety-relevant and other than safety-relevant processes;

at least one safety monitoring control;

at least one safety input/output device;

a redundantly constructed input/output system for safety-relevant processes; and at least one field bus system connecting said operation control, said at least one safety input/output device and said at least one safety monitoring control to one another;

at least one of said safety input/output device and said safety monitoring control being disposed in a distributed manner on an actuating/drive element for, respectively, initiating and performing a safety-relevant process.

2. The monitoring device according to claim 1, wherein the at least one safety input/output device is arranged in a decentralized manner close to the respective actuating/drive element, and the at least one safety input/output device is connected by said field bus system to at least one safety monitoring control.

3. The monitoring device according to claim 1, wherein the safety input/output device is serviceable as an input/output device for other than safety-relevant processes.

4. The monitoring device according to claim 3, wherein the safety input/output device and the input/output device for other than safety-relevant processes are mutually interchangeable.

5. The monitoring device according to claim 1, wherein at least one of the safety monitoring control and the safety input/output device is configurable in accordance with an application thereof.

6. The monitoring device according to claim 1, including a bus coupler for coupling said one field bus system and at least another field bus system of different machine components to one another for safety purposes.

7. The monitoring device according to claim 1, wherein said field bus system is a CAN-bus.

8. A method for monitoring safety-relevant processes in actuating/drive elements of machines, which comprises:

providing a device for monitoring safety-relevant processes, the device having at least one operational control for safety-relevant and other than safety-relevant processes, at least one safety monitoring control, at least one safety input/output device, and a redundantly constructed input/output system for safety-relevant processes;

providing at least one field bus system connecting the at least one operational control, the at least one safety monitoring control and the at least one safety input/output device to one another;

placing at least one of the safety input/output device and the safety monitoring control in a distributed manner on an actuating/drive element; and applying to the bus system information read in by the at least one safety input/output device, and accepting, by the at least one safety monitoring control, the information applied to the bus system, only if this information is relevant for the safety monitoring control.

9. The method according to claim 8, which includes performing a consistency check in one of the operation control, the safety monitoring control and a bus coupler.

10. The method according to claim 8, which includes defining different monitoring criteria based upon the information read in by the at least one safety input/output device.

11. The method according to claim 8, which includes defining different monitoring criteria which are governed by different operating modes of the machine.

* * * * *